US012768379B1

(12) United States Patent
Sands et al.

(10) Patent No.: US 12,768,379 B1
(45) Date of Patent: Oct. 20, 2026

(54) PANEL ASSEMBLIES AND JOINTS AND KITS FOR ASSEMBLING PANEL ASSEMBLIES

(71) Applicant: Globe Trekker Inc., Beaverton, OR (US)

(72) Inventors: William Myron Sands, Beaverton, OR (US); Garrett Pauwels, Beaverton, OR (US)

(73) Assignee: Globe Trekker Inc., Beaverton, OR (US)

( * ) Notice: Subject to any disclaimer, the term of this patent is extended or adjusted under 35 U.S.C. 154(b) by 116 days.

(21) Appl. No.: 19/316,181

(22) Filed: Sep. 2, 2025

Related U.S. Application Data

(60) Provisional application No. 63/804,585, filed on May 12, 2025.

(51) Int. Cl.

| | |
|---|---|
| ***F16B 5/06*** | (2006.01) |
| ***B62D 27/02*** | (2006.01) |
| ***B62D 29/04*** | (2006.01) |

(52) U.S. Cl.
CPC .......... *F16B 5/0614* (2013.01); *B62D 27/023* (2013.01); *B62D 29/048* (2013.01); *F16B 5/0607* (2013.01)

(58) Field of Classification Search
CPC ........ F16B 5/0614; F16B 5/0607; F16B 5/06; F16B 2005/0678; B62D 27/023; B62D 29/048; B62D 29/001; B62D 25/2036; B62D 33/044; B62D 33/046
USPC ......... 296/24.3, 191, 29, 30, 186.1; 403/205
See application file for complete search history.

(56) References Cited

U.S. PATENT DOCUMENTS

| | | | | |
|---|---|---|---|---|
| 4,385,850 A * | 5/1983 | Bobath | F16B 5/0607 | 403/231 |
| 4,662,138 A * | 5/1987 | Bryant | B62D 33/046 | 52/468 |
| 5,888,114 A * | 3/1999 | Slocum | A63H 33/04 | 446/128 |
| 6,588,165 B1 * | 7/2003 | Wright | E04F 19/06 | 52/459 |
| 7,390,052 B2 * | 6/2008 | Bertoch | B62D 21/20 | 296/156 |
| 7,500,713 B2 * | 3/2009 | Riley | B62D 33/046 | 52/584.1 |
| 8,776,376 B2 * | 7/2014 | Williams | E04F 19/064 | 403/403 |
| 2023/0124611 A1 * | 4/2023 | Lutz | B62D 29/041 | 403/309 |

FOREIGN PATENT DOCUMENTS

| | | | |
|---|---|---|---|
| GB | 2425785 A * | 11/2006 | E04F 19/062 |

* cited by examiner

*Primary Examiner* — Amy R Weisberg
*Assistant Examiner* — Denise Lynne Esquivel
(74) *Attorney, Agent, or Firm* — Kolitch Romano Dascenzo Gates LLP

(57) ABSTRACT

Joints (10) and kits (12) for panel assemblies (14) comprise a first profile (20) and a second profile (26) constructed of different materials. When operatively coupled together, the first profile (20) and the second profile (26) collectively define a first-panel channel (34) configured to operatively receive a first panel (16) and a second-panel channel (36) configured to operatively receive a second panel (18).

21 Claims, 9 Drawing Sheets

PANEL ASSEMBLIES AND JOINTS AND KITS FOR ASSEMBLING PANEL ASSEMBLIES

RELATED APPLICATION

The present application claims the benefit of U.S. Provisional Patent Application No. 63/804,595, which was filed on May 12, 2025, and is entitled "Habitat RV Thermal Efficient Extrusion Frame, Improved Manufacturing and Increased Functionalities," the complete disclosure of which is hereby incorporated by reference.

FIELD

The present disclosure relates to panel assemblies.

BACKGROUND

Panel assemblies are used to construct a variety of structures, including enclosures. For example, recreational vehicle (RV) habitats are often constructed of lightweight, insulative panels joined together by aluminum extrusions or plastic extrusions or pultrusions. In some applications, such as in connection with so-called overland or expedition RVs, plastic extrusions or pultrusions may not be sufficiently durable and/or may breakdown when exposed to ultra-violet (UV) light. Conversely, in some applications, aluminum extrusions may not provide desired insulative properties, resulting in undesirable condensation within an enclosure.

SUMMARY

Joints and kits for assembling joints for panel assemblies comprise a first profile and a second profile. The first profile comprises a first wall having a first-wall outer face and a first-wall inner face opposite the first-wall outer face. The first profile is constructed of a first material. In joints, the second profile is operatively coupled to the first profile. In kits, the second profiled is configured to be operatively coupled to the first profile. The second profile comprises a second wall having a second-wall outer face and a second-wall inner face opposite the second-wall outer face. The second profile is constructed of a second material that is different from the first material. In joints, the second profile is operatively coupled to the first profile. In kits, the second profile is configured to be operatively coupled to the first profile. The first profile and the second profile collectively define a bridge that interconnects the first wall and the second wall when the first profile and the second profile are operatively coupled together. The bridge defines a coupling that extends along the joint. In joints, the coupling operatively couples together the first profile and the second profile. In kits, the coupling is configured to operatively couple together the first profile and the second profile. When operatively coupled together, the first profile and the second profile collectively define a first-panel channel configured to operatively receive a first panel and a second-panel channel configured to operatively receive a second panel.

DESCRIPTION

Figure 1:
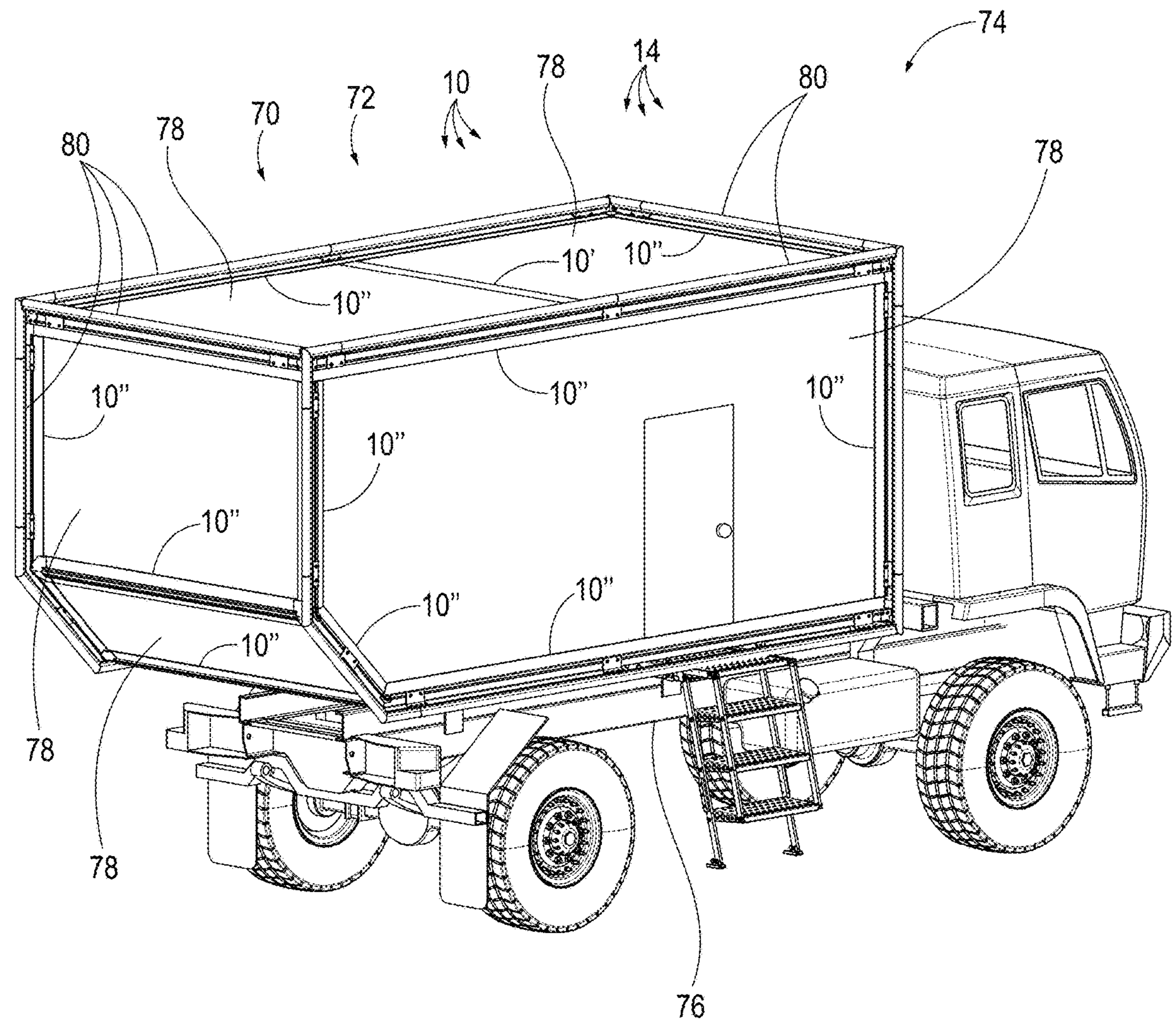
FIG. 1 is an illustration of an example overland RV that comprises panel assemblies according to the present disclosure.

FIG. 1 illustrates an example overland/expedition recreational vehicle (RV) 74 with a chassis 76 and an enclosure 70 operatively supported by the chassis 76. The enclosure 70 is in the form of a habitat 72 that is at least partially constructed of panel assemblies 14 according to the present disclosure. In particular, panel assemblies 14 comprise a plurality of panels 78 that are operatively coupled together by one or more joints 10 according to the present disclosure. The example RV 74 of FIG. 1 also includes a plurality of brush guards 80 operatively coupled to a subset of the joints 10. However, panel assemblies 14 and joints 10 according to the present disclosure are not limited to RV applications, let alone to overland/expedition RV applications, to the assembly of enclosures 70 or to habitats 72, and may be used in any suitable application. For example, panels assemblies 14 and joints 10 also may be used to assemble trailer enclosures, box van or truck enclosures, insulated containers, mobile homes, manufactured homes, temporary structures, cabinetry, etc.

Figure 2:
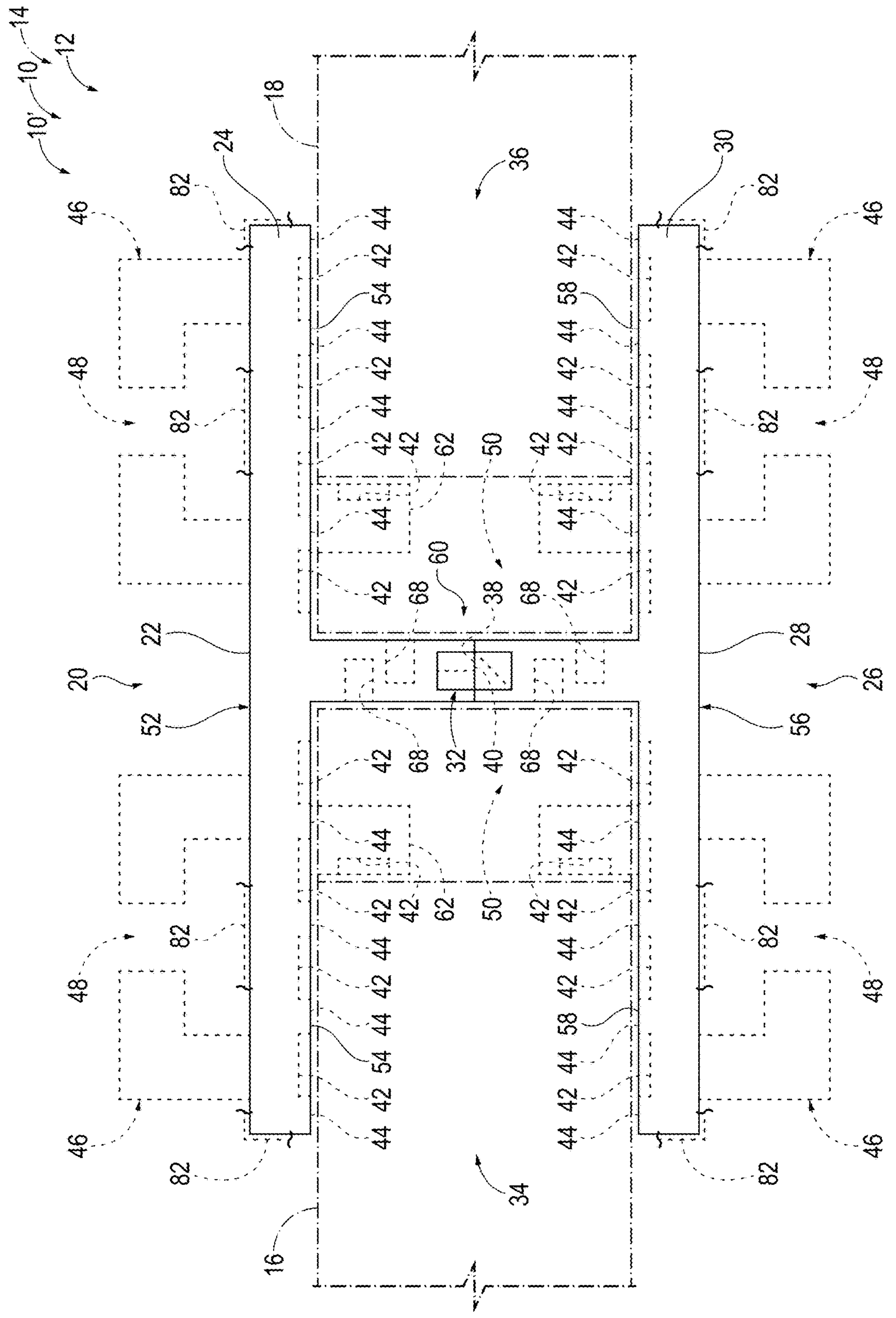
FIG. 2 is a schematic illustration representing joints for assembling panel assemblies, kits for assembling panel assemblies, and panel assemblies according to the present disclosure.
Figure 3:
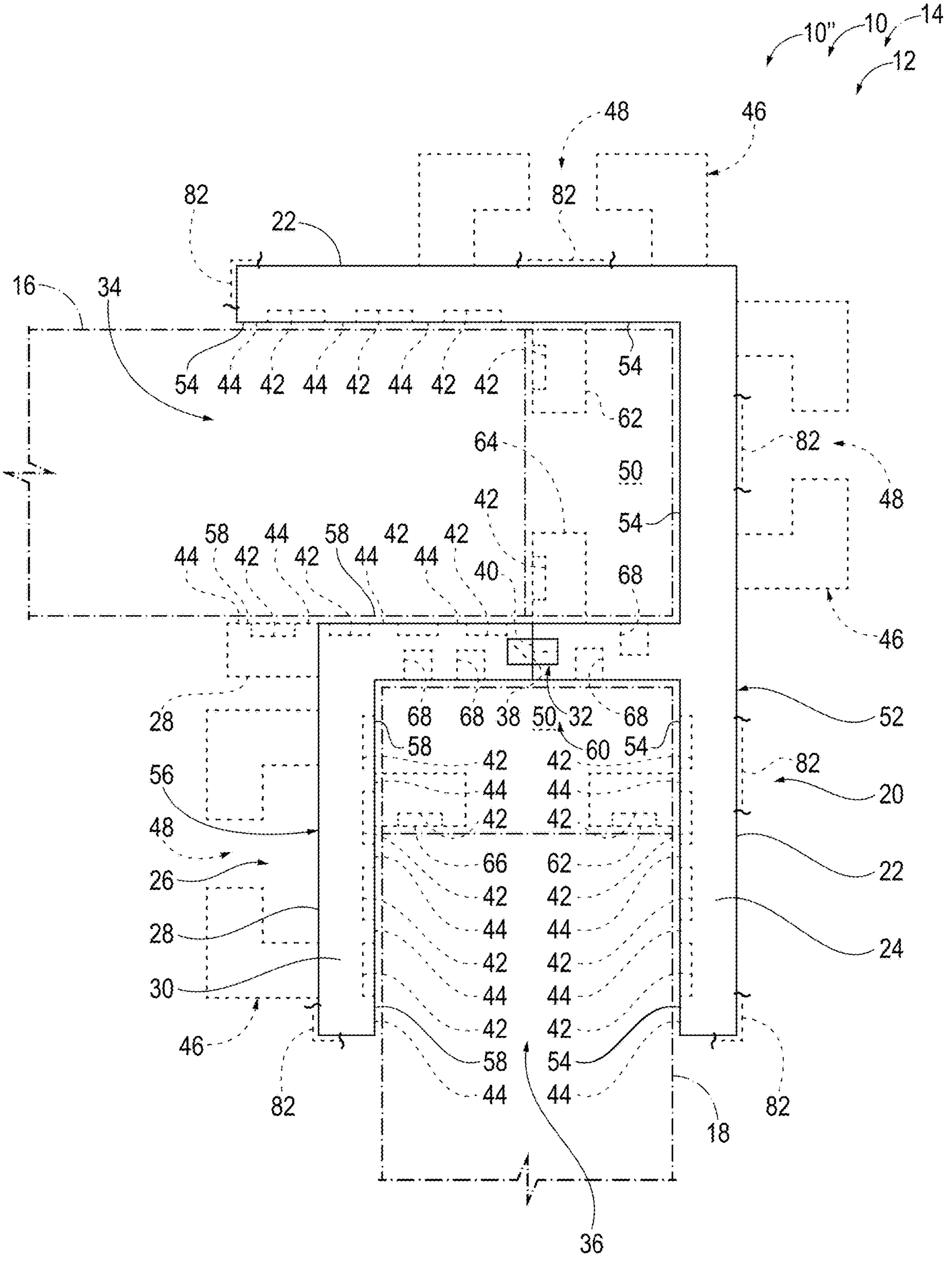
FIG. 3 is another schematic illustration representing joints for assembling panel assemblies, kits for assembling panel assemblies, and panel assemblies according to the present disclosure.

FIGS. 2 and 3 schematically represent joints 10, kits 12 for assembling joints 10, and panel assemblies 14 according to the present disclosure. Generally in FIGS. 2 and 3, elements that are likely to be included in a given example are illustrated in solid lines, while elements that are optional to a given example or that correspond to one or more specific examples are illustrated in broken lines. However, elements that are illustrated in solid lines are not essential to all examples of the present disclosure, and an element shown in solid lines may be omitted from a particular example without departing from the scope of the present disclosure.

Joints 10 and kits 12 comprise a first profile 20 and a second profile 26. Herein, a "joint 10" is the structure defined by a first profile 20 and a second profile 26 when operatively coupled together for operative joining of two panels, whereas, a "kit 12" is a collection of a first profile 20 and a second profile 26 not operatively coupled together. For example, a kit 12 may be sold or otherwise delivered for assembly into a joint 10 by an end-user. Accordingly, in a joint 10, the second profile 26 may be described as being operatively coupled to the first profile 20, whereas in a kit 12, the second profile 26 may be described as being configured to be operatively coupled to the first profile 20.

Herein, a "profile" is an elongate structure that has a uniform cross-section along its length, such as being formed by an extrusion or pultrusion process. Profiles additionally or alternatively may be described as or referred to as brackets, sections, or portions of a joint 10.

As schematically represented in FIGS. 2 and 3, joints 10 and kits 12 for assembling joints 10 for panel assemblies 14 comprise a first panel 16 and a second panel 18. In some applications, the panels of a panel assembly 14 may be described as or referred to as structural insulated panels (SIPs) and/or as sandwich panels, although joints 10 may be used in connection with any suitable configuration of panels.

In FIG. 2, the first panel 16 and the second panel 18 are schematically illustrated as being co-planar, aligned with each other, and/or at 180 degrees relative to each other, with such joints 10 referenced herein and indicated in the drawings as joints 10'. In FIG. 3, the first panel 16 and the second panel 18 are schematically illustrated as being at a non-180 degree angle relative to each other, with such joints 10 reference herein and indicated in the drawings as joints 10". While FIG. 3 is schematically represented with the first panel 16 and the second panel 18 at a right angle (i.e., 90 degrees) relative to each other, joints 10 and kits 12 may be configured for any suitable angle between the first panel 16 and the second panel 18, including 90 to 180 degrees, such as 90 degrees, 120 degrees, 135 degrees, 150 degrees, or 180 degrees.

Turning back to FIG. 1, the habitat 72 of the example RV 74 has one joint 10' operatively coupling together two co-planar panels 78 that form the upper surface of the habitat 72, nine joints 10" with the associated panels 78 being at 90 degrees relative to each other, and two joints 10" with the associated panels 78 being at 135 degrees relative to each other. Other configurations of panel assemblies 14, enclosures 70, habitats 72, and RVs 74 may be assembled with various selections of joints 10 and panels 78, and the example of FIG. 1 is not limiting.

With reference again to FIGS. 2 and 3, the first profile 20 comprises a first wall 52 having a first-wall outer face 22 and a first-wall inner face 54 that is opposite the first-wall outer face 22. Similarly, the second profile 26 comprises a second wall 56 having a second-wall outer face 28 and a second-wall inner face 58 that is opposite the second-wall outer face 28. The first profile 20 is constructed of a first material 24, whereas the second profile 26 is constructed of a second material 30 that is different from the first material 24. In some examples, the first material 24 is a metal, such an aluminum alloy. Such a construction may be well suited for durability of the joint 10 when the first profile 20 is on the exterior side of a joint 10 of an enclosure, such as a habitat of an RV. In some examples of joints 10 and kits 12, the second material 30 is a plastic, such as a polyvinyl chloride (PVC) or a fiber reinforced plastic, such as a fiberglass. Such a construction may result in desired insulative properties of a joint 10, such as when the second profile 26 is on the interior side of a joint 10 of an enclosure, such as a habitat of an RV. In an example joint 10 whose first profile 20 is constructed of an aluminum alloy and second profile 26 is constructed of PVC, the joint's R-value may be at least 1.5 or two times the R-value of a comparable joint constructed solely of the same aluminum alloy.

As schematically represented in FIGS. 2 and 3, in some examples, the first profile 20 and/or the second profile 26 comprises a coating or plating 82, such as a paint, a powder coating, an epoxy coating, a polyurethane coating, a zinc-rich primer coating, a zinc plating, a silicone coating, a polysiloxane coating, a polytetrafluoroethylene (PTFE) coating, a fluorinated ethylene propylene copolymer (FEP) coating, a perfluoroalkoxy (PFA) coating, and/or other coatings or platings selected for desired properties (e.g., durability) of a joint 10. In some examples, a coating or plating 82 is applied to one or both of the first profile 20 and/or the second profile 26 prior to coupling together the first profile 20 and the second profile 26 to form a joint 10. In other examples, a coating or plating 82 is applied to a joint 10 after the first profile 20 and the second profile 26 are operatively coupled together.

When the first profile 20 and the second profile 26 are operatively coupled together, the first profile 20 and the second profile 26 collectively define a bridge 60 that interconnects the first wall 52 and the second wall 56. The bridge 60 additionally or alternatively may be described as or referred to as a third wall. As schematically represented in FIGS. 2 and 3, the bridge 60 defines a coupling 32 that extends along the joint 10 and that operatively couples together, or configured to operatively couple together, the first profile 20 and the second profile 26. In other words, the coupling 32 is the structure of the first profile 20 and the second profile 26 that enable them to be operatively coupled together to form a joint 10.

When the first profile 20 and the second profile 26 are operatively coupled together, the first profile 20 and the second profile 26 collectively define a first-panel channel 34 that is configured to operatively receive a first panel 16 and a second-panel channel 36 that is configured to operatively receive a second panel 18. By "operatively receive," it is meant that the first panel 16 and the second panel 18 are received in the first-panel channel 34 and the second-panel channel 36 in a fixed manner so as to construct a panel assembly 14. For example, the panels may be described as being coupled to the profiles within the channels. The panels may be coupled to the profiles 20,26 utilizing one or more suitable methods, including (but not limited to) one or more of a snap-fit arrangement, a friction-fit arrangement, a press-fit arrangement, a slide-fit arrangement, an adhesive arrangement, a fastener arrangement (e.g., utilizing screws, fastener pairs [e.g., bolts and nuts], rivets, etc.), and/or a welding arrangement.

The coupling 32 may take a variety of configurations depending on the ultimate application of a joint 12. For example, the coupling 32 may define one or more of a snap-fit arrangement, a friction-fit arrangement, a press-fit arrangement, a slide-fit arrangement, an adhesive arrangement, an overlapping arrangement, a fastener arrangement (e.g., utilizing screws, fastener pairs, rivets, etc.), and/or a welding arrangement between the first profile 20 and the second profile 26.

In some examples, the coupling 32 may be described as being configured to permit coupling together of the first profile 20 and the second profile 26 while restricting separation of the first profile 20 and the second profile 26. By "restricting separation," it does not mean that the first profile 20 and the second profile 26 necessarily cannot be (i.e., prevented from being) decoupled from each other once coupled together, but rather that the first profile 20 and the second profile 26 will not inadvertently become uncoupled when the formed joint 10 is being used for its intended purpose in an intended manner. That said, in some examples, once coupled together, the first profile 20 and the second profile 26 may be unable to be decoupled from each other without damage and/or destruction of one or both of the first profile 20 or the second profile 26.

As schematically represented in FIGS. 2 and 3 within the schematic representation of the coupling 32, in some examples, within the bridge 60, one of the first profile 20 or the second profile 26 defines at least one barb 38 that is configured to engage the other of the first profile 20 or the second profile 26 to restrict separation of the first profile 20 and the second profile 26 when the first profile 20 and the second profile 26 are operatively coupled together (i.e., when coupled together to form a joint 10). The barb 38 additionally or alternatively may be described as a ramped shoulder, a serration, a tooth, a hook, or the like.

As also schematically represented in FIGS. 2 and 3, in some examples, the other of the first profile 20 or the second profile 26 defines at least one shoulder 40 that is configured to engage the at least one barb 38 and restrict separation of the first profile 20 and the second profile 26 when the first profile 20 and the second profile 26 are operatively coupled together. In such examples, the coupling 32 may be described as having a snap-fit arrangement between the barb 38 and the shoulder 40.

In some examples, one of the first profile 20 or the second profile 26 defines at least two opposing barbs 38 and the other of the first profile 20 or the second profile 26 defines at least two opposing shoulders 40 that are configured to engage the at least two opposing barbs 38 and restrict separation of the first profile 20 and the second profile 26 when the first profile 20 and the second profile 26 are operatively coupled together.

In other examples, one of the first profile 20 or the second profile 26 defines a plurality of opposing barbs 38 that are configured to bite into the other of the first profile 20 or the second profile 26 to restrict separation of the first profile 20 and the second profile 26 when the first profile 20 and the second profile 26 are operatively coupled together. In other words, rather than the barbs 38 engaging corresponding shoulders 40, the barbs 38 may cut into the material of the other profile to restrict separation of the first profile 20 and the second profile 26. For example, such a construction may be implemented with the barbs 38 being of the profile constructed of a metal and the other profile being constructed of a plastic.

As schematically represented in FIGS. 2 and 3, in some examples, the first profile 20 and the second profile 26 define a plurality of adhesive pockets 42 that face the first-panel channel 34 and/or the second-panel channel 36 when the first profile 20 and the second profile 26 are operatively coupled together to define a joint 10. When present, the adhesive pockets 42 provide a volume for receipt of an adhesive to operatively adhere a panel within the channel for the operative assembly of a panel assembly 14. In some examples, the adhesive pockets 42 of the first profile 20 are configured differently than the adhesive pockets 42 of the second profile 26. Such a configuration may be appropriate based on the material of construction of the first profile 20 or the second profile 26 and/or based on the material of construction of the first panel 16 or the second panel 18. For example, the adhesive pockets 42 of the first profile 20 may be sized and/or shaped differently than the adhesive pockets 42 of the second profile 26.

Additionally or alternatively as also schematically represented in FIGS. 2 and 3, in some examples, the first profile 20 and the second profile 26 comprise a plurality of ridges 44 that extend into the first-panel channel 34 and/or the second-panel channel 36 when the first profile 20 and the second profile 26 are operatively coupled together. The ridges 44 may define adhesive pockets 42 between adjacent pairs of ridges 44. The ridges 44 may be configured to frictionally engage and/or bite or cut into a panel received within the channels. In some examples, the ridges 44 of the first profile 20 are configured differently than the ridges 44 of the second profile 26. Such a configuration may be appropriate based on the material of construction of the first profile or the second profile. In some examples, the ridges 44 of the first profile 20 are sized, shaped, and/or spaced differently than the ridges 44 of the second profile 26.

With continued reference to FIGS. 2 and 3, in some examples, the first profile 20 defines one or more accessory attachment structures 46 that are configured for selective attachment of one or more accessories to the first profile 20. For example, when a joint 10 is used to construct a panel assembly 14 for the construction of a habitat of an RV, it may be desirable to mount accessories to the exterior and/or the interior of the habitat. In the example of an overland/expedition RV, brush guards are often mounted to the exterior of the RV's habitat to further protect the habitat when the RV is traveling through tight spaces with overgrowth, trees, and the like. Other accessories include lights, speakers, awnings, lift jacks, and other attachments.

As schematically represented in FIGS. 2 and 3, in some examples, one or both of the first profile 20 or the second profile 26 defines one or more T-slots 48 that extend along the first-wall outer face 22 or the second-wall outer face 28. That is, these T-slots 48 are examples of attachment structures 46. When present, a T-slot 48 provides structure for receipt of a nut, bolt, or similar fastener with which a corresponding fastener mates for operative attachment of an accessory.

With continued reference to FIGS. 2 and 3, in some examples, the joint 10 defines at least one void 50 that is at least partially open to the first-panel channel 34 or to the second-panel channel 36 at least when the first profile 20 and the second profile 26 are operatively coupled together. In some examples, a single one of the first profile 20 or the second profile 26 defines a void 50, such as in the example of the upper void 50 in FIG. 3 defined solely by the first profile 20. In other examples, a void 50 is defined by both the first profile 26 and the second profile 26, such as in the examples of the voids 50 of FIG. 2 and the lower void 50 of FIG. 3. Herein, a void 50 is a channel that runs the length of the joint 10 for purposes of running electrical wiring and/or plumbing, such as in the construction of an RV or other structure where electrical wiring and/or plumbing is used. In some applications, a void 50 may additionally or alternatively be referred to as or described as a wire-chase channel and/or as a plumbing channel. Additionally or alternatively, inclusion of a void 50 permits the use of fasteners (e.g., bolts, screws, rivets, etc.) extending through the first wall 52 or the second wall 56 of a joint 10, such as for attachment of various accessories to the joint 10, without the fasteners damaging or otherwise interfering with the associated panels of a panel assembly 14.

In some examples, the first profile 20 comprises a first-profile flange 62 that extends from the first-wall inner face 54 into the first-panel channel 34 or the second-panel channel 36 to at least partially define the at least one void 50. In some examples, the bridge 60 comprises a bridge flange 64 that extends into the first-panel channel 34 or the second-panel channel 36 to at least partially define the at least one void 50. In some examples, the second profile 20 comprises a second-profile flange 66 that extends from the second-wall inner face 58 into the first-panel channel 34 or the second-panel channel 36 to at least partially define the at least one void 50.

As also schematically represented in FIGS. 2 and 3, in some examples, the bridge 60 defines one or more cavities 68 that are open to the first-panel channel 34 or the second-panel channel 36 at least when the first profile 20 and the second profile 26 are operatively coupled together. When present, these channels 34 may be provided to serve as weight reduction of the joint 10 and/or may facilitate the uniform extrusion or pultrusion of the first profile 20 or the second profile 26. For example, in some configurations, depending on the configuration of the coupling 32, the thickness of the bridge 60 may need to be greater than the thickness of the first wall 52 and the second wall 56. Including cavities 68 in the bridge 60 may avoid warping, twisting, and dimensional variations that otherwise might result from the extrusion or pultrusion process.

As discussed above, joints 10 and kits 12 may be configured for any suitable angle between the first panel 16 and the second panel 18. Accordingly, joints 10 also may be described in terms of the relative angular orientation of the first-panel channel 34 and the second-panel channel 36, such as being 90 to 180 degrees relative to each other. For example, in some examples, when the first profile 20 and the second profile 26 are operatively coupled together, the first-panel channel 34 and the second-panel channel 36 are longitudinally aligned (i.e., are 180 degrees relative to each other). As other examples, the first-panel channel 34 and the second-panel channel 36 are 90 degrees, 120 degrees, 135 degrees, or 150 degrees relative to each other.

Turning now to FIGS. 4-14, illustrative non-exclusive examples of joints 10 are illustrated. Where appropriate, the reference numerals from the schematic illustrations of FIGS. 2 and 3 are used to designate corresponding parts of the examples of FIGS. 4-14; however, the examples of FIGS. 4-14 are non-exclusive and do not limit joints 10, kits 12, and panel assemblies 14 to the illustrated embodiments of joints 10 of FIGS. 4-14. That is, joints 10 may incorporate any number of the various aspects, configurations, characteristics, properties, etc. of joints 10 that are illustrated in and discussed with reference to the schematic representations of FIGS. 2 and 3 and/or the embodiments of FIGS. 4-14, as well as variations thereof, without requiring the inclusion of all such aspects, configurations, characteristics, properties, etc. For the purpose of brevity and clarity of the drawings, each previously discussed component, part, portion, aspect, region, etc. or variants thereof may not be discussed, illustrated, and/or labeled again with respect to the embodiments of FIGS. 4-14; however, it is within the scope of the present disclosure that the previously discussed features, variants, etc. may be utilized with such embodiments.

FIGS. 4-14 are end views of example joints 10, that is with the joints 10 being elongate into the page. Each joint 10 of FIGS. 4-14 comprises a first profile 20 with a plurality of adhesive pockets 42 and a second profile 26 with a plurality of adhesive pockets 42; however for clarity in FIGS. 4-14, the adhesive pockets 42 are not labeled.

Figure 4:
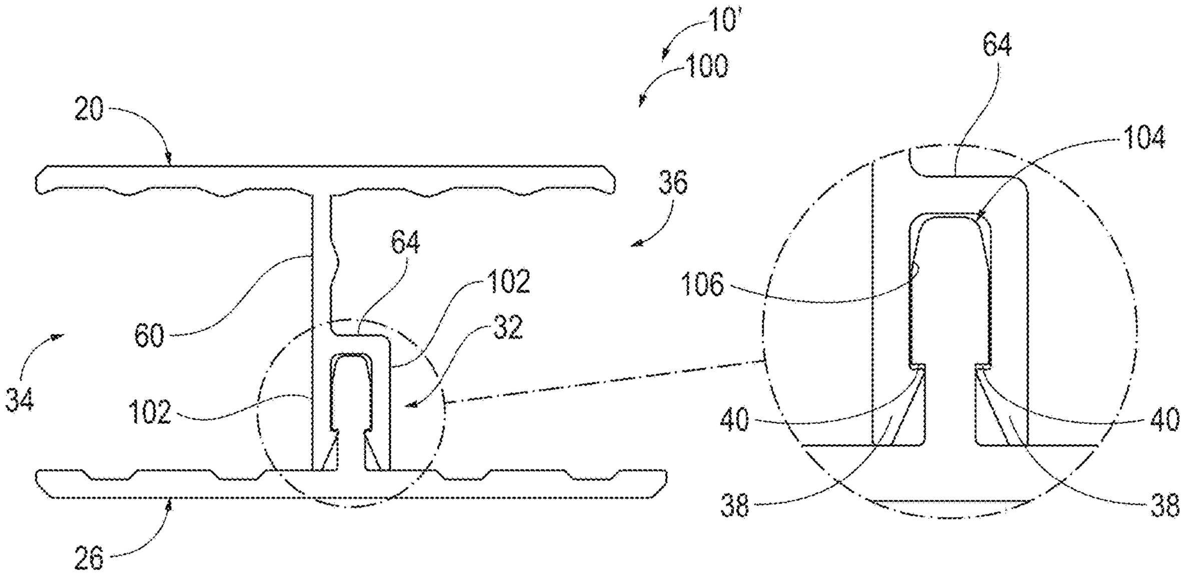
FIG. 4 is a detailed end view of an example joint for assembling panel assemblies according to the present disclosure.

Joint 100 of FIG. 4 is an example of a joint 10' configured for receipt of co-planar panels. In joint 100, within the bridge 60, the first profile 20 comprises two parallel arms 102 defining a channel 106. Each arm 102 comprises a barb 38 extending into the channel 106. The second profile 26 of joint 100 comprises a flange 104 within the bridge 60, with the flange 104 comprising opposing shoulders 40 engaged with the two barbs 38 of the arms 102 for operative coupling of the first profile 20 and the second profile 26 together.

Figure 5:
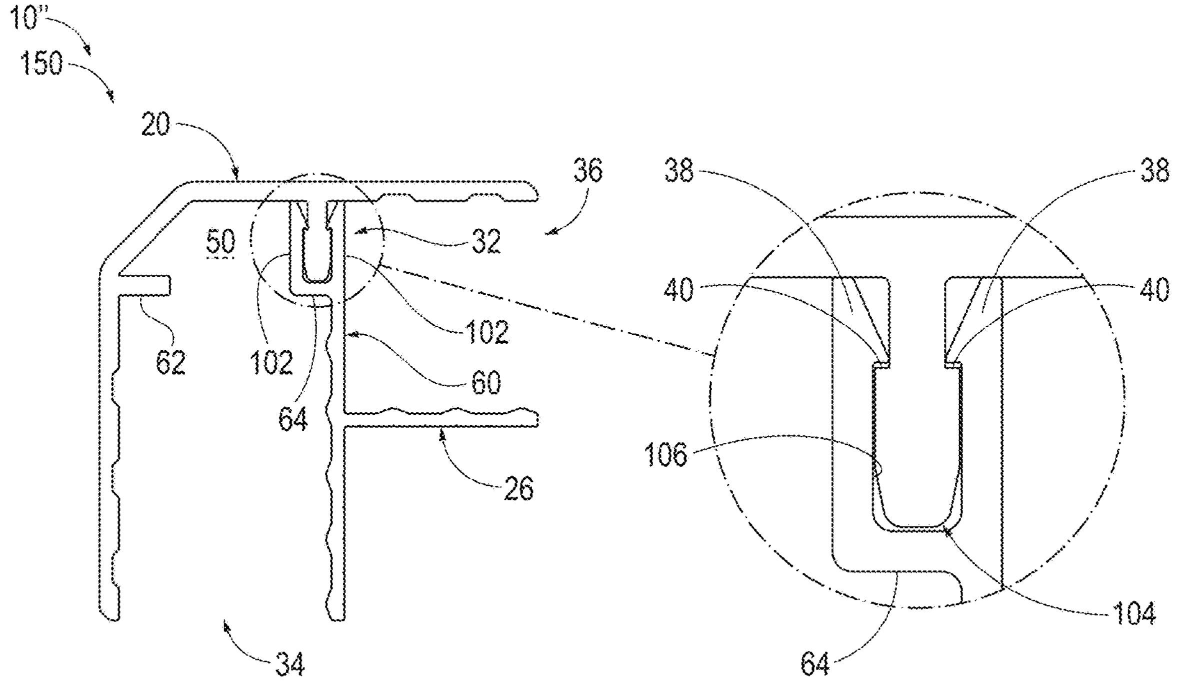
FIG. 5 is a detailed end view of another example joint for assembling panel assemblies according to the present disclosure.

Joint 150 of FIG. 5 is an example of a joint 10" configured for receipt of panels at 90 degrees relative to each other. The coupling 32 of joint 150 is similar to the coupling 32 of joint 100 of FIG. 4, except that in joint 150, the first profile 20 comprises the flange 104 with the opposing shoulders 40, and the second profile 26 comprises the parallel arms 102 with the opposing barbs 38. Joint 150 also is an example of a joint 10" whose first profile 20 comprises a first-profile flange 62, which together with the bridge 60 defines a void 50.

Figure 6:
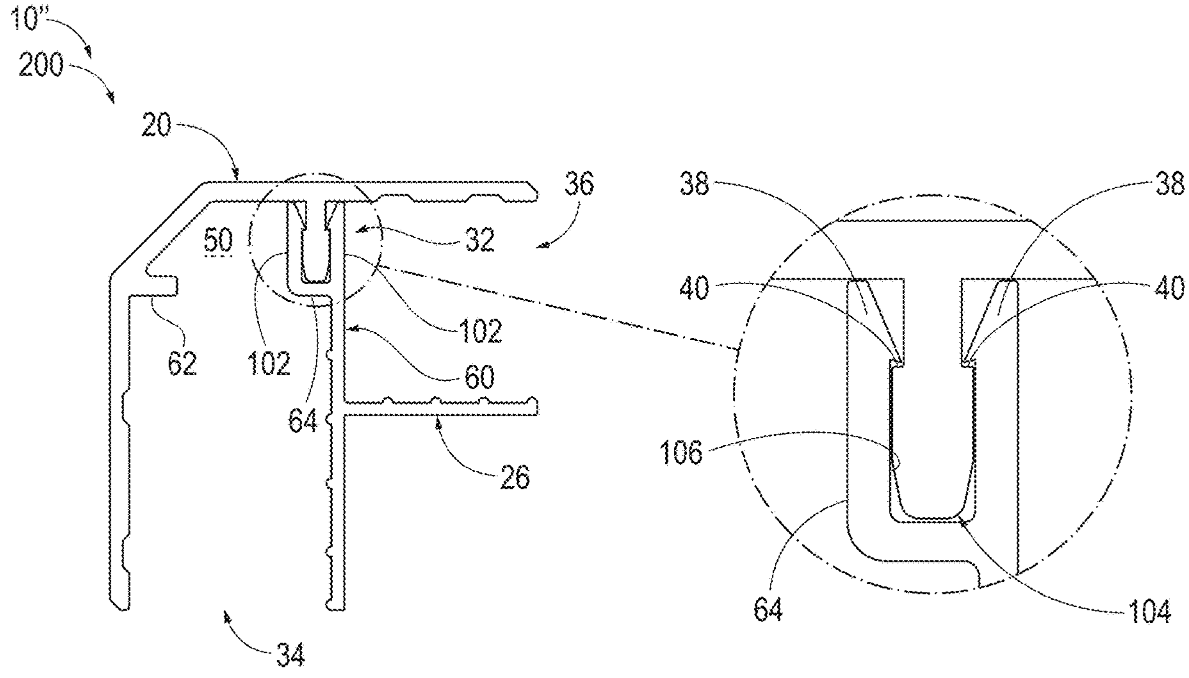
FIG. 6 is a detailed end view of another example joint for assembling panel assemblies according to the present disclosure.

Joint 200 of FIG. 6 is similar to joint 150 of FIG. 5, except that that the adhesive pockets 42 of the second profile 26 are configured slightly differently.

Figure 7:
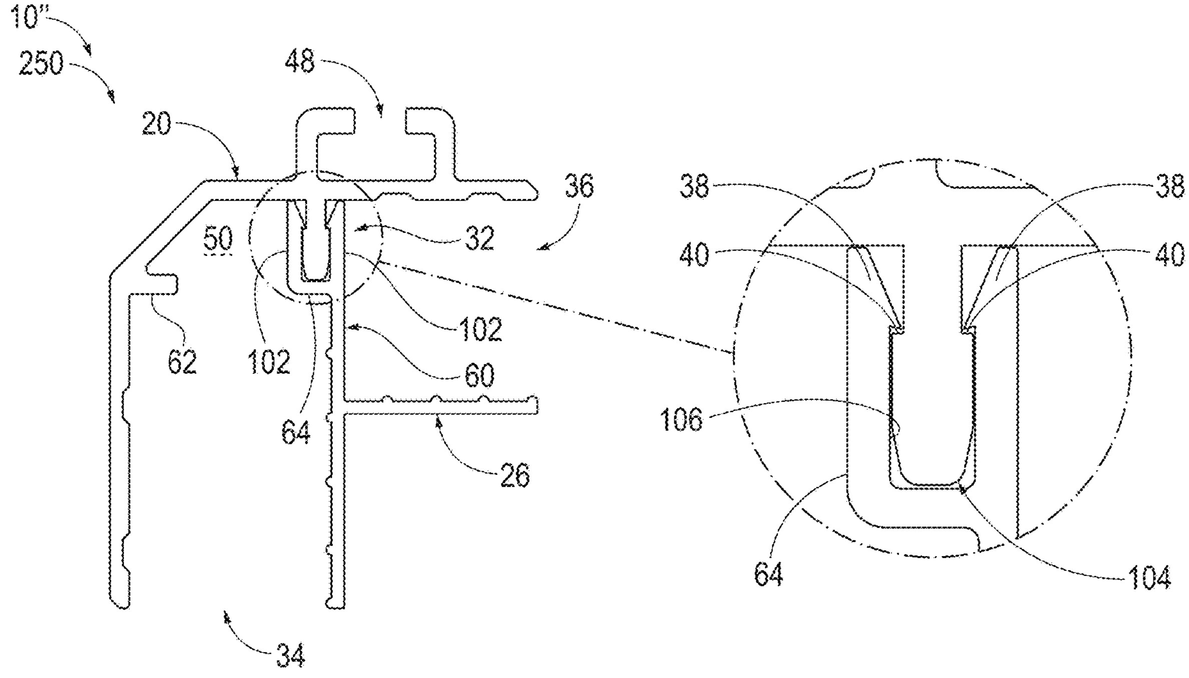
FIG. 7 is a detailed end view of another example joint for assembling panel assemblies according to the present disclosure.

Joint 250 of FIG. 7 is similar to joint 200 of FIG. 6, except that the first profile 20 defines a T-slot 48 for operative attachment of accessories to the joint 250.

Figure 8:
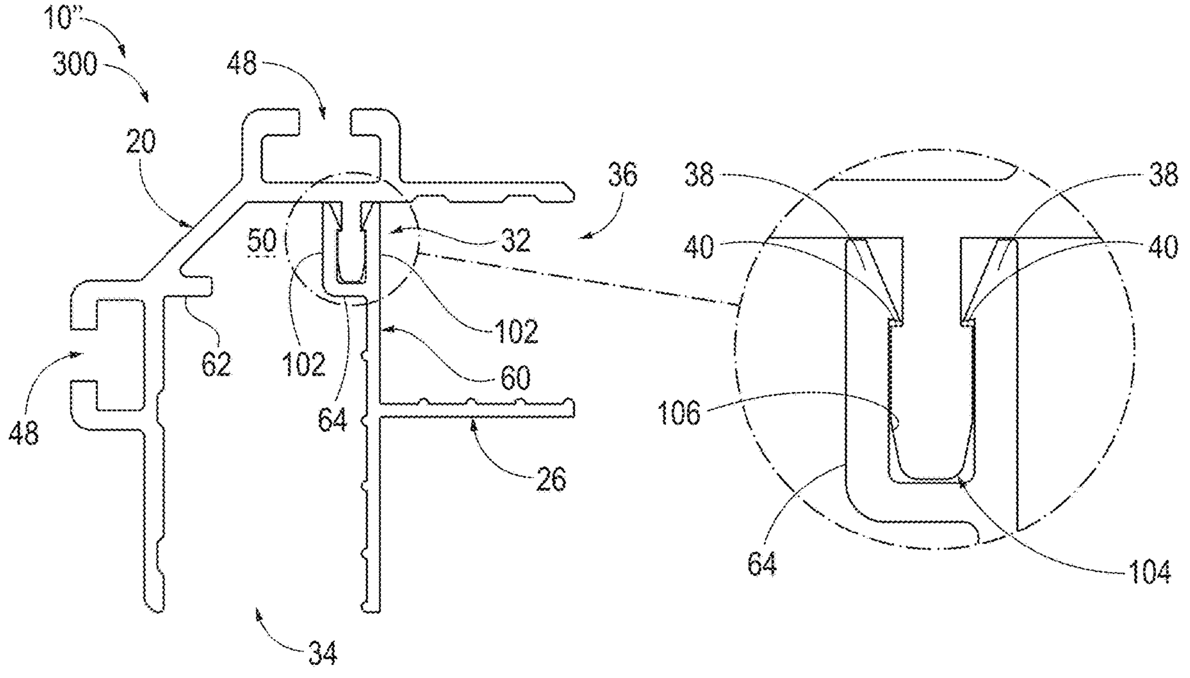
FIG. 8 is a detailed end view of another example joint for assembling panel assemblies according to the present disclosure.

Joint 300 of FIG. 8 is similar to joint 250 of FIG. 7, except that the first profile defines two T-slots 48 for operative attachment of accessories to the joint 300.

Figure 9:
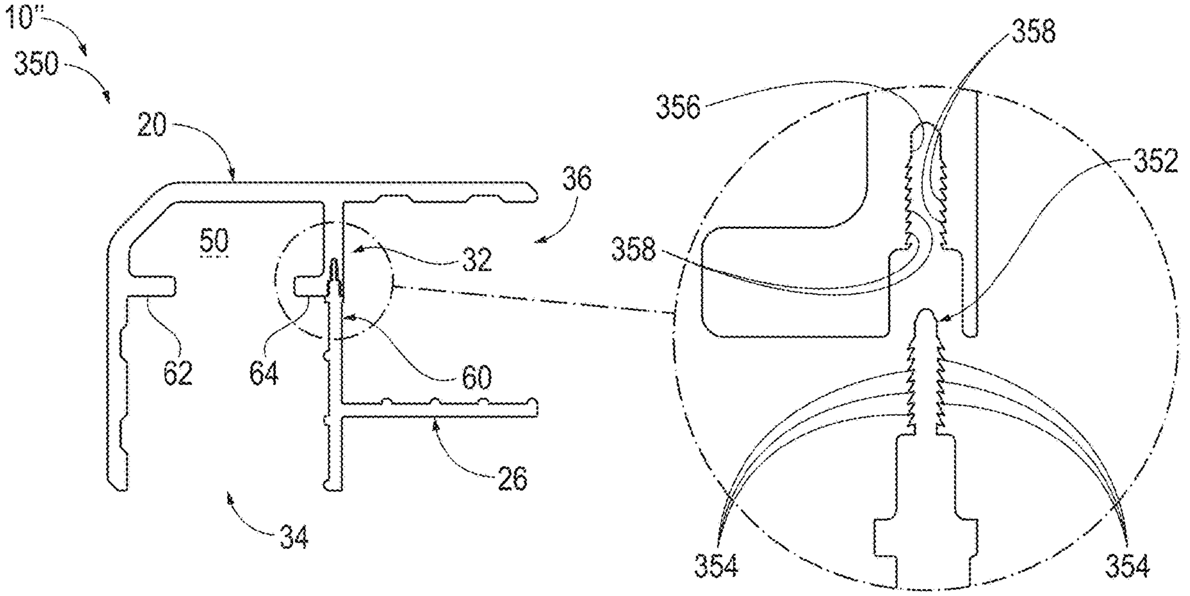
FIG. 9 is a detailed end view of another example joint for assembling panel assemblies according to the present disclosure.

Joint 350 of FIG. 9 is yet another example of a joint 10" configured for receipt of panels at 90 degrees relative to each other. In joint 350, within the bridge 60, the end 352 of the second profile 26 defines opposing serrations 354, and the first profile 20 defines a channel 356 with corresponding serrations 358 that are operatively engaged with the opposing serrations 354 of the end 352 of the second profile 26. Also in joint 350, the first profile 20 comprises a first-profile flange 62 and a bridge flange 64 and defines a void 50.

Figure 10:
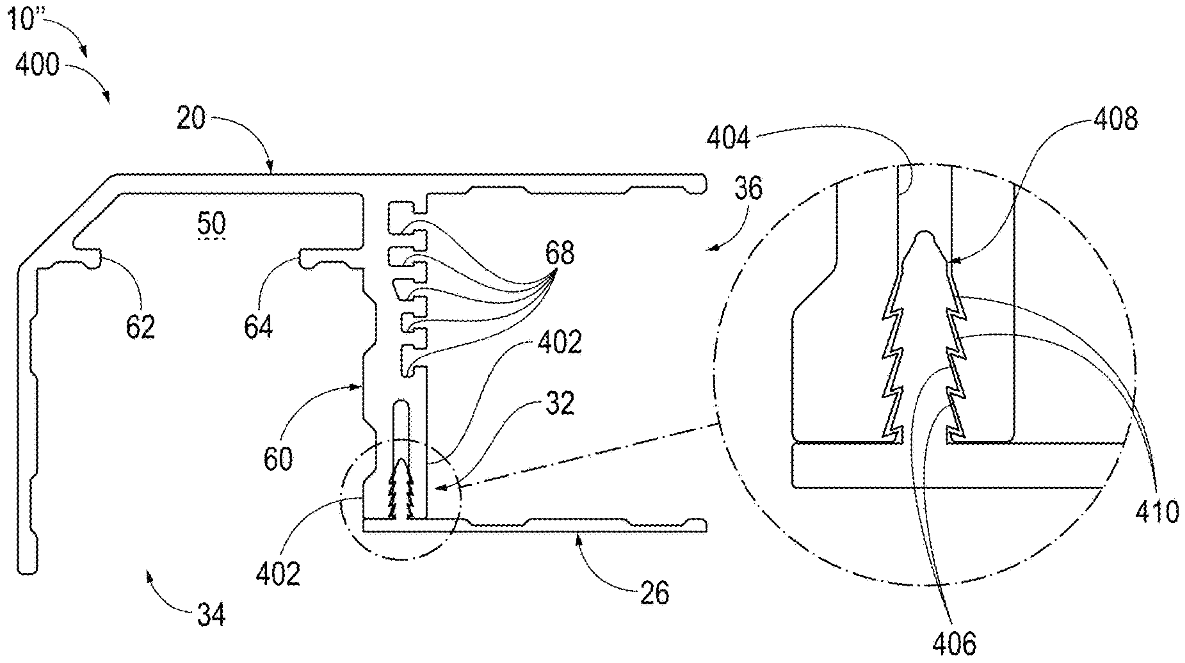
FIG. 10 is a detailed end view of another example joint for assembling panel assemblies according to the present disclosure.

Joint 400 of FIG. 10 is an example of a joint 10" whose bridge 60 defines a plurality of cavities 68 open to the second-panel channel 36 to facilitate formation of the first profile 20 by extrusion. Within the bridge 60 of joint 400, the first profile 20 comprises two parallel arms 402 defining a channel 404 and serrations 406. Within the bridge 60, the second profile 26 comprises a flange 408 with opposing serrations 410 operatively engaged with the serrations 406 of the arms 402.

Figure 11:
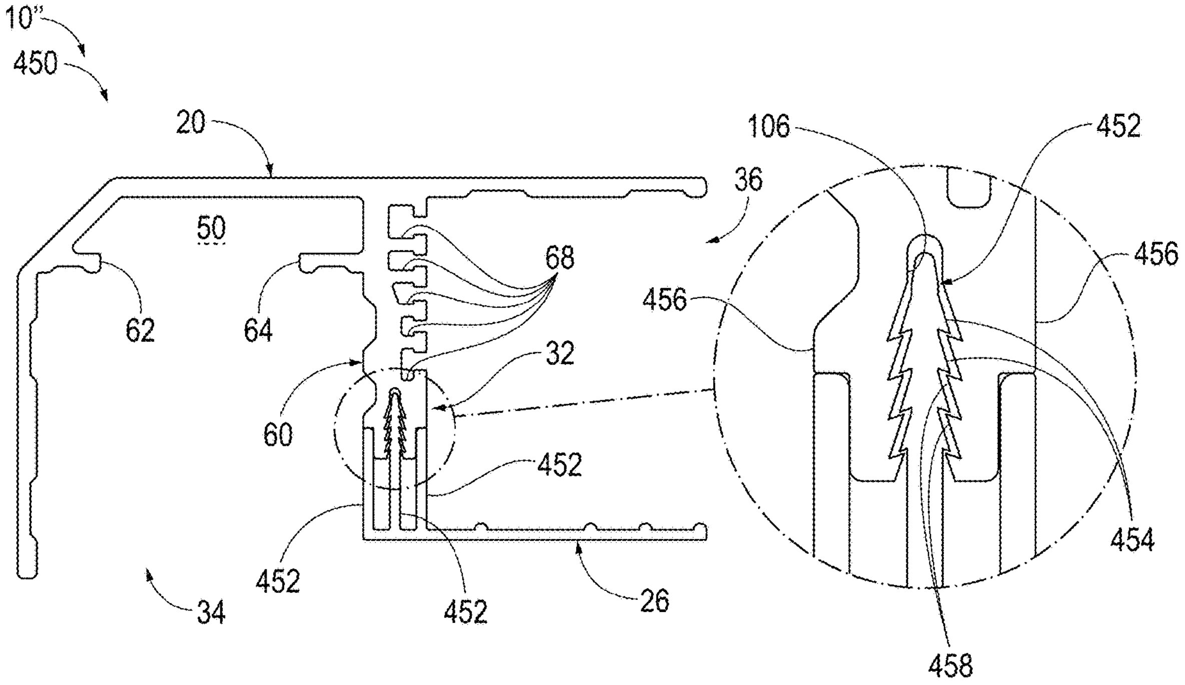
FIG. 11 is a detailed end view of another example joint for assembling panel assemblies according to the present disclosure.

Joint 450 of FIG. 11 is similar to joint 400 of FIG. 10, but with the coupling 32 configured slightly differently. In particular, within the bridge 60, the second profile 26 comprises three parallel arms 452, with the center of the three arms 452 defining opposing serrations 454. Within the bridge 60, the first profile 20 comprises two parallel arms 456 with serrations 458 that are operatively engaged with the opposing serrations 454 of the second profile 26.

Figure 12:
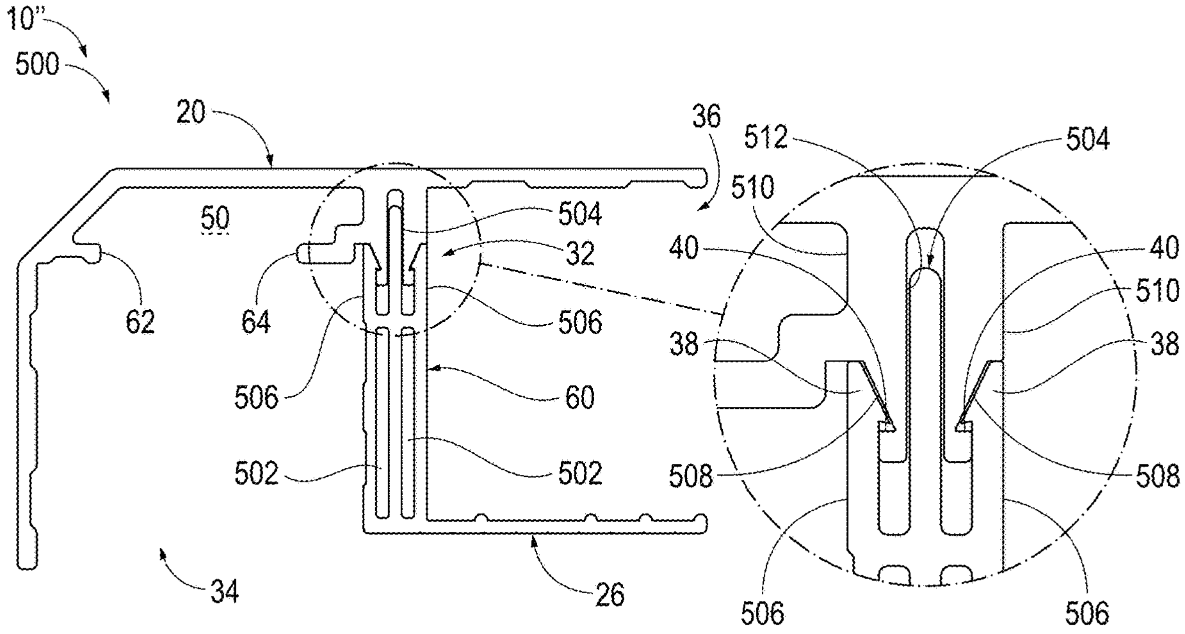
FIG. 12 is a detailed end view of another example joint for assembling panel assemblies according to the present disclosure.

In joint 500 of FIG. 12, within the bridge 60, the second profile 26 defines two elongate cavities 502 to facilitate formation of the second profile 26 by pultrusion. Also within the bridge 60, the second profile 26 comprises two arms 506, each comprising a barb 38. The second profile 26 also comprises a third arm 504 extending between the two arms 506. Also within the bridge 60, the first profile 20 comprises two arms 510 that define a channel 512 therebetween. The two arms 510 define shoulders 40 that are operatively engaged with the barbs 38 of the arms 506. The third arm 504 of the second profile 26 extends into the channel 512 of the first profile 20.

Figure 13:
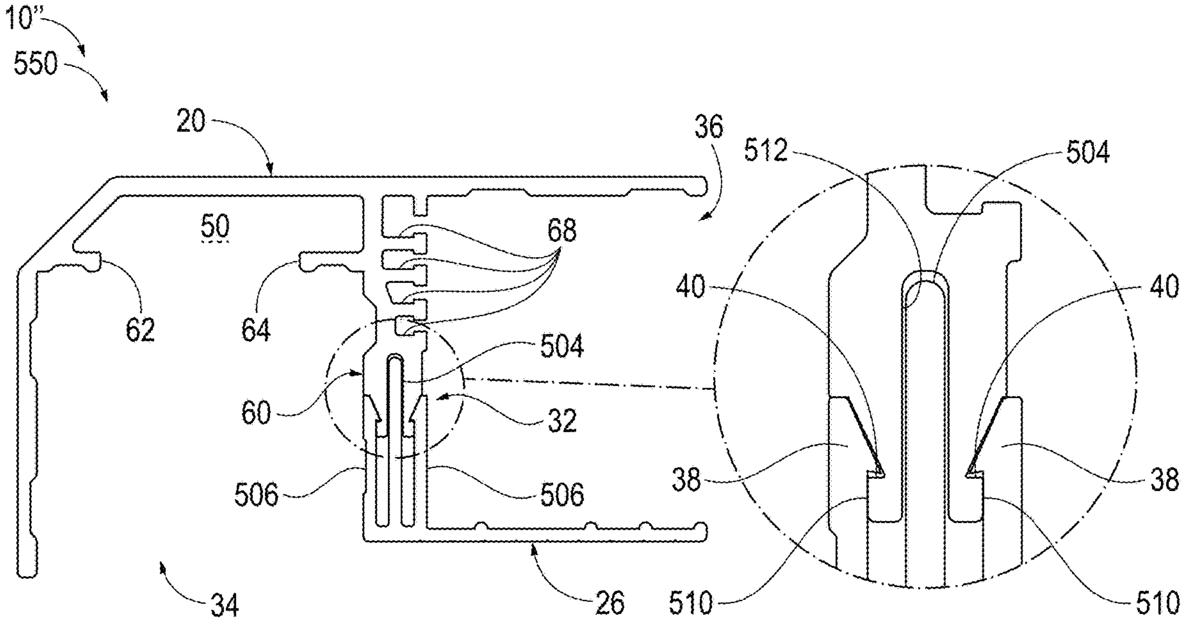
FIG. 13 is a detailed end view of another example joint for assembling panel assemblies according to the present disclosure.

Joint 550 of FIG. 13 is similar to joint 500 of FIG. 12, except that within the bridge 60, the first profile 20 defines a plurality of cavities 68 open to the second-panel channel 36 to facilitate formation of the first profile 20 by extrusion.

Figure 14:
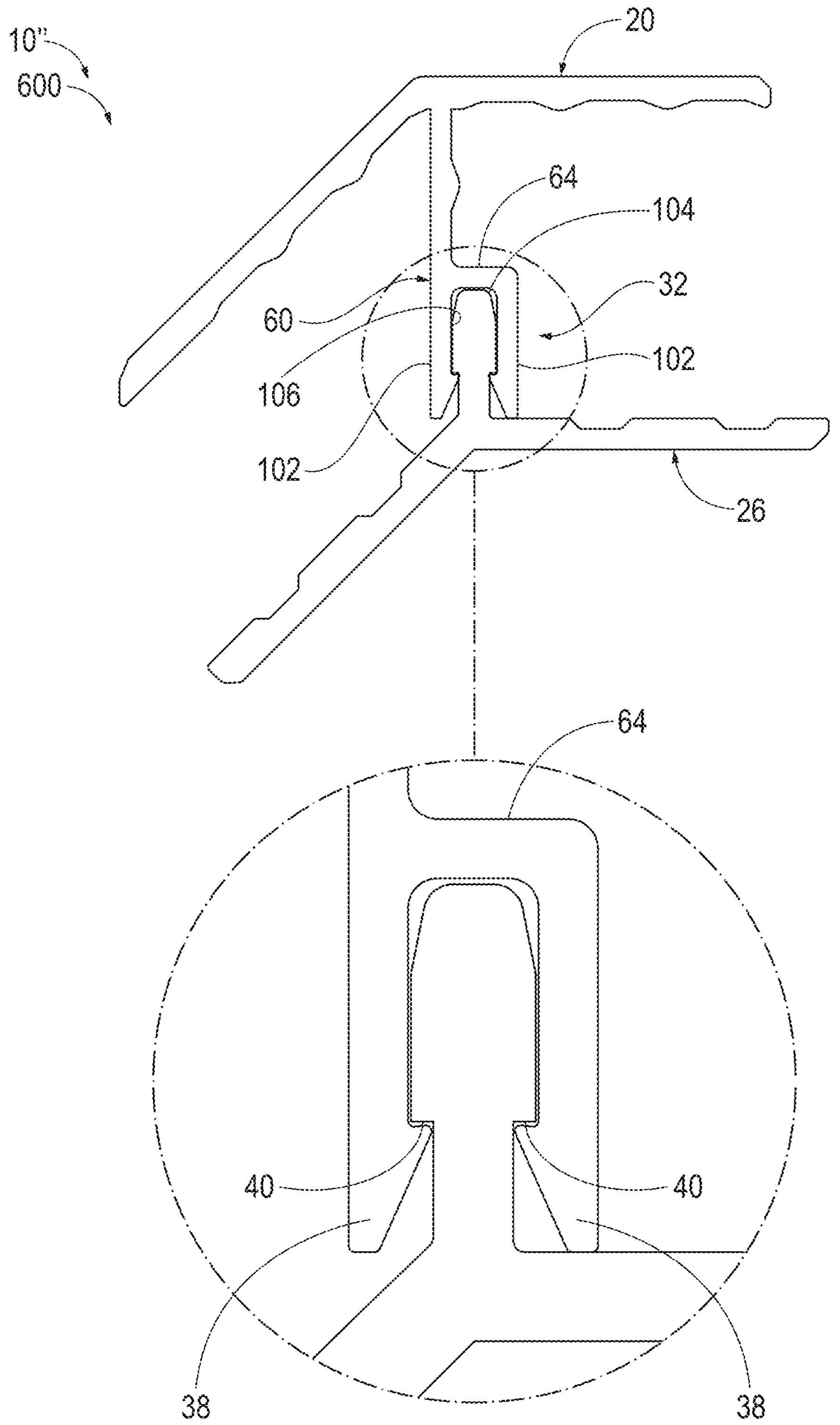
FIG. 14 is a detailed end view of another example joint for assembling panel assemblies according to the present disclosure.

Joint 600 of FIG. 14 is similar to joint 100 of FIG. 4, except that joint 600 is an example of a joint 10" configured for receipt of panels at 135 degrees relative to each other.

Illustrative, non-exclusive examples of inventive subject matter according to the present disclosure are described in the following enumerated paragraphs:

A. A joint (10) or a kit (12) for assembling a joint (10) for a panel assembly (14) comprising a first panel (16) and a second panel (18), the joint (10) or the kit (12) comprising:

- a first profile (20) comprising a first wall (52) having a first-wall outer face (22) and a first-wall inner face (54) opposite the first-wall outer face (22), wherein the first profile (20) is constructed of a first material (24); and
- a second profile (26) operatively coupled to, or configured to be operatively coupled to, the first profile (20), wherein the second profile (26) comprises a second wall (56) having a second-wall outer face (28) and a second-wall inner face (58) opposite the second-wall outer face (28), and wherein the second profile (26) is constructed of a second material (30) that is different from the first material (24);
- wherein the first profile (20) and the second profile (26) collectively define a bridge (60) interconnecting the first wall (52) and the second wall (56) when the first profile (20) and the second profile (26) are operatively coupled together, wherein the bridge (60) defines a coupling (32) extending along the joint (10) and operatively coupling together, or configured to operatively couple together, the first profile (20) and the second profile (26); and
- wherein when operatively coupled together, the first profile (20) and the second profile (26) collectively define a first-panel channel (34) configured to operatively receive the first panel (16) and a second-panel channel (36) configured to operatively receive the second panel (18).

A1. The joint (10) or the kit (12) of paragraph A, wherein the first material (24) is a metal, optionally an aluminum alloy.

A2. The joint (10) or the kit (12) of any of paragraphs A-A1, wherein the second material (30) is a plastic, optionally a polyvinyl chloride (PVC), or a fiber reinforced plastic, optionally a fiberglass.

A3. The joint (10) or the kit (12) of any of paragraphs A-A2, wherein the first profile (20) is an extrusion or a pultrusion, and wherein the second profile (26) is an extrusion or a pultrusion.

A4. The joint (10) or the kit (12) of any of paragraphs A-A3, wherein the coupling (32) defines, or is configured to define, a snap-fit arrangement, a friction-fit arrangement, a press-fit arrangement, a slide-fit arrangement, an adhesive arrangement, an overlapping arrangement, and/or a fastener arrangement between the first profile (20) and the second profile (26).

A5. The joint (10) or the kit (12) of any of paragraphs A-A4, wherein the coupling (32) is configured to permit coupling together of the first profile (20) and the second profile (26) and restrict separation of the first profile (20) and the second profile (26).

A6. The joint (10) or the kit (12) of any of paragraphs A-A5, wherein, within the bridge (60), one of the first profile (20) or the second profile (26) defines at least one barb (38) configured to engage the other of the first profile (20) or the second profile (26) to restrict separation of the first profile (20) and the second profile (26) when the first profile (20) and the second profile (26) are operatively coupled together.

A6.1. The joint (10) or the kit (12) of paragraph A6, wherein the other of the first profile (20) or the second profile (26) defines at least one shoulder (40) configured to engage the at least one barb (38) and restrict separation of the first profile (20) and the second profile (26) when the first profile (20) and the second profile (26) are operatively coupled together.

A6.1.1. The joint (10) or the kit (12) of paragraph A6.1, wherein the at least one barb (38) comprises at least two opposing barbs (38) and the at least one shoulder (40) comprise at least two opposing shoulders (40) configured to engage the at least two opposing barbs (38) and restrict separation of the first profile (20) and the second profile (26) when the first profile (20) and the second profile (26) are operatively coupled together.

A6.2. The joint (10) or the kit (12) of paragraph A6, wherein the at least one barb (38) comprises a plurality of opposing barbs (38) configured to bite into the other of the first profile (20) or the second profile (26) to restrict separation of the first profile (20) and the second profile (26) when the first profile (20) and the second profile (26) are operatively coupled together.

A7. The joint (10) or the kit (12) of any of paragraphs A-A6.2, wherein the first profile (20) and the second profile (26) define a plurality of adhesive pockets (42) facing the first-panel channel (34) and/or the second-panel channel (36) when the first profile (20) and the second profile (26) are operatively coupled together.

A7.1 The joint (10) or the kit (12) of paragraph A7, wherein the adhesive pockets (42) of the first profile (20) are configured differently than the adhesive pockets (42) of the second profile (26).

A7.2. The joint (10) or the kit (12) of any of paragraphs A7-A7.1, wherein the adhesive pockets (42) of the first profile (20) are sized differently than the adhesive pockets (42) of the second profile (26).

A7.3. The joint (10) or the kit (12) of paragraph A7-A7.2, wherein the adhesive pockets (42) of the first profile (20) are shaped differently than the adhesive pockets (42) of the second profile (26).

A8. The joint (10) or the kit (12) of any of paragraphs A-A7.3, wherein the first profile (20) and the second profile (26) comprise a plurality of ridges (44) extending into the first-panel channel (34) and/or the second-panel channel (36) when the first profile (20) and the second profile (26) are operatively coupled together.

A8.1. The joint (10) or the kit (12) of paragraph A8, wherein the plurality of ridges (44) of the first profile (20) are configured differently than the plurality of ridges (44) of the second profile (26).

A8.2. The joint (10) or the kit (12) of any of paragraphs A8-A8.1, wherein the plurality of ridges (44) of the first profile (20) are sized differently than the plurality of ridges (44) of the second profile (26).

A8.3. The joint (10) or the kit (12) of any of paragraphs A8-A8.2, wherein the plurality of ridges (44) of the first profile (20) are shaped differently than the plurality of ridges (44) of the second profile (26).

A9. The joint (10) or the kit (12) of any of paragraphs A-A8.3, wherein the first profile (20) or the second profile (26) defines one or more accessory attachment structures (46) configured for selective attachment of one or more accessories to the first profile (20) or the second profile (26).

A10. The joint (10) or the kit (12) of any of paragraphs A-A9, wherein the first profile (20) or the second profile (26) defines one or more T-slots (48) extending along the first-wall outer face (22) or the second-wall outer face (28).

A11. The joint (10) or the kit (12) of any of paragraphs A-A10, wherein the joint (10) defines at least one void (50) at least partially open to the first-panel channel (34) or the second-panel channel (36), at least when the first profile (20) and the second profile (26) are operatively coupled together.

A11.1. The joint (10) or the kit (12) of paragraph A11, wherein the first profile (20) comprises a first-profile flange (62) extending from the first-wall inner face (54) into the first-panel channel (34) or the second-panel channel (36) to at least partially define the at least one void (50).

A11.2. The joint (10) or the kit (12) of any of paragraphs A11-A11.1, wherein the bridge (60) comprises a bridge flange (64) extending into the first-panel channel (34) or the second-panel channel (36) to at least partially define the at least one void (50).

A11.3. The joint (10) or the kit (12) of any of paragraphs A11-A11.2, wherein the second profile (20) comprises a second-profile flange (66) extending from the second-wall inner face (58) into the first-panel channel (34) or the second-panel channel (36) to at least partially define the at least one void (50).

A12. The joint (10) or the kit (12) of any of paragraphs A-A11.3, wherein the bridge (60) defines one or more cavities (68) open to the first-panel channel (34) or the second-panel channel (36), at least when the first profile (20) and the second profile (26) are operatively coupled together.

A13. The joint (10) or the kit (12) of any of paragraphs A-A12, wherein when the first profile (20) and the second profile (26) are operatively coupled together, the first-panel channel (34) and the second-panel channel (36) are longitudinally aligned.

A14. The joint (10) or the kit (12) of any of paragraphs A-A12, wherein when the first profile (20) and the second profile (26) are operatively coupled together, the first-panel channel (34) and the second-panel channel (36) are 90 to 180 degrees relative to each other.

A14.1. The joint (10) or the kit (12) of any of paragraphs A-A12, wherein when the first profile (20) and the second profile (26) are operatively coupled together, the first-panel channel (34) and the second-panel channel (36) are 90 degrees, 120 degrees, 135 degrees, 150 degrees, or 180 degrees relative to each other.

B. A panel assembly (14), comprising:

the joint (10) of any of paragraphs A-A14.1;

the first panel (16) operatively received in the first-panel channel (34); and the second panel (18) operatively received in the second-panel channel (36).

C. An enclosure (70), comprising at least one panel assembly (14) of paragraph B.

C1. The enclosure (70) of paragraph C, wherein the at least one panel assembly (14) comprises a plurality of the panel assemblies (14) operatively coupled together.

C2. The enclosure (70) of any of paragraphs C-C1, wherein the enclosure (70) defines a habitat (72).

D. A recreational vehicle (74), comprising:

a chassis (76); and the enclosure (70) of any of paragraphs C-C2 operatively supported by the chassis (76).

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A joint (10) for a panel assembly (14) comprising a first panel (16) and a second panel (18), the joint (10) comprising:

a first profile (20) comprising a first wall (52) having a first-wall outer face (22) and a first-wall inner face (54) opposite the first-wall outer face (22), wherein the first profile (20) is constructed of a first material (24); and a second profile (26) operatively coupled to the first profile (20), wherein the second profile (26) comprises a second wall (56) having a second-wall outer face (28) and a second-wall inner face (58) opposite the second-wall outer face (28), and wherein the second profile (26) is constructed of a second material (30) that is different from the first material (24);

wherein the first profile (20) and the second profile (26) collectively define a bridge (60) interconnecting the first wall (52) and the second wall (56), wherein the bridge (60) defines a coupling (32) extending along the joint (10) and operatively coupling together the first profile (20) and the second profile (26);

wherein the first profile (20) and the second profile (26) collectively define a first-panel channel (34) configured to operatively receive the first panel (16) and a second-panel channel (36) configured to operatively receive the second panel (18);

wherein the joint (10) defines at least one void (50) at least partially open to the first-panel channel (34) or the second-panel channel (36); and wherein the bridge (60) comprises a bridge flange (64) extending into the first-panel channel (34) or the second-panel channel (36) to at least partially define the at least one void (50).

2. The joint (10) of claim 1, wherein the first material (24) is a metal, and the second material (30) is a plastic.

3. The joint (10) of claim 1, wherein the first profile (20) is an extrusion or a pultrusion, and wherein the second profile (26) is an extrusion or a pultrusion.

4. The joint (10) of claim 1, wherein the coupling (32) defines a snap-fit arrangement, a friction-fit arrangement, a press-fit arrangement, a slide-fit arrangement, an adhesive arrangement, an overlapping arrangement, and/or fastener arrangement between the first profile (20) and the second profile (26).

5. The joint (10) of claim 1, wherein the coupling (32) is configured to restrict separation of the first profile (20) and the second profile (26).

6. The joint (10) of claim 1, wherein, within the bridge (60), one of the first profile (20) or the second profile (26) defines at least one barb (38) configured to engage the other of the first profile (20) or the second profile (26) to restrict separation of the first profile (20) and the second profile (26).

7. The joint (10) of claim 6, wherein the other of the first profile (20) or the second profile (26) defines at least one shoulder (40) configured to engage the at least one barb (38) and restrict separation of the first profile (20) and the second profile (26).

8. The joint (10) of claim 7, wherein the at least one barb (38) comprises at least two opposing barbs (38), and the at least one shoulder (40) comprise at least two opposing shoulders (40) configured to engage the at least two opposing barbs (38) and restrict separation of the first profile (20) and the second profile (26).

9. The joint (10) of claim 1, wherein the first profile (20) and the second profile (26) define a plurality of adhesive pockets (42) facing the first-panel channel (34) and/or the second-panel channel (36).

10. The joint (10) of claim 9, wherein the plurality of adhesive pockets (42) of the first profile (20) are configured differently than the plurality of adhesive pockets (42) of the second profile (26).

11. The joint (10) of claim 1, wherein the first profile (20) or the second profile (26) defines one or more accessory attachment structures (46) configured for selective attachment of one or more accessories to the first profile (20) or the second profile (26).

12. The joint (10) of claim 1, wherein the first profile (20) comprises a first-profile flange (62) extending from the first-wall inner face (54) into the first-panel channel (34) or the second-panel channel (36) to at least partially define the at least one void (50).

13. The joint (10) of claim 1, wherein the bridge (60) defines one or more cavities (68) open to the first-panel channel (34) or the second-panel channel (36).

14. The joint (10) of claim 1, wherein the first-panel channel (34) and the second-panel channel (36) are longitudinally aligned.

15. The joint (10) of claim 1, wherein the first-panel channel (34) and the second-panel channel (36) are 90 degrees, 120 degrees, 135 degrees, 150 degrees, or 180 degrees relative to each other.

16. A panel assembly (14), comprising:

the joint (10) of claim 1;

the first panel (16) operatively received in the first-panel channel (34); and the second panel (18) operatively received in the second-panel channel (36).

17. A recreational vehicle (74), comprising:

a chassis (76); and an enclosure (70) operatively supported by the chassis (76), wherein the enclosure (70) comprises at least one panel assembly (14) of claim 16.

18. A kit (12) for assembling a joint (10) for a panel assembly (14) comprising a first panel (16) and a second panel (18), the kit (12) comprising:

a first profile (20) comprising a first wall (52) having a first-wall outer face (22) and a first-wall inner face (54) opposite the first-wall outer face (22), wherein the first profile (20) is constructed of a first material (24); and a second profile (26) configured to be operatively coupled to the first profile (20), wherein the second profile (26) comprises a second wall (56) having a second-wall outer face (28) and a second-wall inner face (58) opposite the second-wall outer face (28), and wherein the second profile (26) is constructed of a second material (30) that is different from the first material (24);

wherein the first profile (20) and the second profile (26) collectively define a bridge (60) interconnecting the first wall (52) and the second wall (56) when the first profile (20) and the second profile (26) are operatively coupled together, wherein the bridge (60) defines a coupling (32) extending along the joint (10) and configured to operatively couple together the first profile (20) and the second profile (26); and wherein when operatively coupled together, the first profile (20) and the second profile (26) collectively define a first-panel channel (34) configured to operatively receive the first panel (16) and a second-panel channel (36) configured to operatively receive the second panel (18);

wherein when the first profile (20) and the second profile (26) are operatively coupled together, the joint (10) defines at least one void (50) at least partially open to the first-panel channel (34) or the second-panel channel (36); and wherein the bridge (60) comprises a bridge flange (64) extending into the first-panel channel (34) or the second-panel channel (36) to at least partially define the at least one void (50).

19. The kit (12) of claim 18, wherein the bridge flange (64) partially defines the coupling (32).

20. The joint (10) of claim 1, wherein the bridge flange (64) partially defines the coupling (32).

21. The joint (10) of claim 1, wherein the at least one void (50) is directly adjacent to the first wall (52) and not the second wall (56).

* * * * *